(12) United States Patent
Yagyu et al.

(10) Patent No.: US 8,474,984 B2
(45) Date of Patent: Jul. 2, 2013

(54) PROJECTION DISPLAY DEVICE

(75) Inventors: Shinji Yagyu, Tokyo (JP); Koji Nakanishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 343 days.

(21) Appl. No.: 13/013,901

(22) Filed: Jan. 26, 2011

(65) Prior Publication Data

US 2011/0228233 A1 Sep. 22, 2011

(30) Foreign Application Priority Data

Mar. 19, 2010 (JP) .................................. 2010-065043

(51) Int. Cl.
*G03B 21/28* (2006.01)

(52) U.S. Cl.
USPC .................. 353/75; 353/77; 353/78; 353/100

(58) Field of Classification Search
USPC .............. 353/50, 74, 75, 76, 77, 78, 100, 101
See application file for complete search history.

(56) References Cited

U.S. PATENT DOCUMENTS

| 6,139,156 A * | 10/2000 | Okamori et al. ................. 353/98 |
| 6,461,001 B2 * | 10/2002 | Okamori et al. ............... 353/102 |
| 6,631,997 B2 | 10/2003 | Miyata et al. |
| 7,344,256 B2 * | 3/2008 | Watanabe et al. ............... 353/97 |

FOREIGN PATENT DOCUMENTS

JP 4032658 B2 1/2008

* cited by examiner

*Primary Examiner* — Tony Ko (74) *Attorney, Agent, or Firm* — Birch, Stewart, Kolasch & Birch, LLP (57) ABSTRACT

A projection display device includes a light source, an optical intensity-equalizing element, an optical modulating element, an optical diffusion element, a relay optical system that is configured such that an output end of the optical intensity-equalizing element and a display element plane of the optical modulating element are optically conjugate, and a projection optical system. The relay optical system includes a first lens unit that condenses a light from the optical intensity-equalizing element and a second lens unit that further condenses a light from the first lens unit. The optical diffusion element is arranged between an light incident side of the first lens unit and the optical intensity-equalizing element. An optical axis of the second lens unit and a center of the output end of the optical intensity-equalizing element are shifted in a same direction from an optical axis of the first lens unit.

4 Claims, 7 Drawing Sheets

PROJECTION DISPLAY DEVICE

BACKGROUND OF THE INVENTION

1. Field of the Invention

The present invention relates to a projection display device that displays an image by projecting a spatially intensity-modulated light.

2. Description of the Related Art

In a conventional projection display device employing a light valve (a reflection optical modulating element), an illumination optical system guides a light from a light source to the light valve, and the light valve performs a spatial intensity modulation of the light. Then, the spatially intensity-modulated light (image component light) is guided to a screen by a projection optical system, and an image is displayed on the screen.

A white light source, such as a high-pressure mercury lamp and a xenon lamp, or a multicolor light source, such as a light emitting diode (LED) and a laser, is used as a light source for the projection display device. Therefore, the illumination optical system is required to have a function of illuminating the light valve efficiently without impairing its image quality due to characteristics specific to each of these various light sources. In addition, in recent years, the projection display device further needs to have a high contrast for achieving an image representation with an impact.

In an area of a projection television, which is an application of the projection display device, a digital micro-mirror device (DMD®) is employed as the light valve to make a configuration of the optical system relatively simple. This light valve is formed by arranging a plurality of movable mirror elements corresponding to a plurality of pixels (for example, a few hundred thousand elements), respectively, in a plane. Furthermore, the light valve is configured such that an inclination angle of each of the mirror elements is changed in response to pixel information. In the projection display device including the light valve, the illumination optical system, the light valve, and the projection optical system are configured such that the image light passes through a projection lens toward the screen when the mirror element is inclined to an ON position, and the image light becomes out of an optical axis of the projection optical system when the mirror element is inclined to an OFF position.

In such a projection display device, a decrease in the contrast must be considered, which is due to a specific operation of the light valve. For example, a method of controlling the angle distribution of illumination light beams by arranging an aperture unit in the illumination optical system has been known as a technique for improving the contrast of the illumination optical system (Japanese Patent No. 4032658 (pages 4 to 10, and FIGS. 1, 8, and 9)).

In the case of the conventional technique described above, because the center axis of the illumination optical system is arranged inclined with respect to a normal line of the light valve, a regular reflection light reflected at the surface of the cover glass of the light valve travels toward a direction near the middle between the direction of the ON light beam and the direction of the OFF light beam. Therefore, an optical design is taken such that the OFF light beam and the regular reflection light are not incorporated into the projection optical system. However, in the conventional technique described above, there is a problem in that the contrast is decreased because of optical components such as a diffraction light caused by a micro-lattice structure of the light valve and a scattered light generated in the illumination optical system.

SUMMARY OF THE INVENTION

It is an object of the present invention to at least partially solve the problems in the conventional technology.

According to an aspect of the present invention, there is provided a projection display device including: a light source; an optical intensity-equalizing element that equalizes an optical intensity of the light emitted from the light source; an optical modulating element that performs a spatial intensity modulation of an input light and outputs the spatially intensity-modulated light; an optical diffusion element that is arranged between the optical intensity-equalizing element and the optical modulating element, the optical diffusion element diffusing the light from the optical intensity-equalizing element; a relay optical system that guides the light from the optical diffusion element to the optical modulating element, the relay optical system being configured such that an output end of the optical intensity-equalizing element and a display element plane of the optical modulating element are optically conjugate; and a projection optical system that projects the spatially intensity-modulated light from the optical modulating element to a screen, wherein the relay optical system includes a first lens unit that condenses an output light from the optical intensity-equalizing element and a second lens unit that further condenses a light from the first lens unit, the optical diffusion element is arranged between the optical intensity-equalizing element and a lens of the first lens unit, the lens being arranged at a position most proximate to a light incident side, and the second lens unit and the optical intensity-equalizing element are arranged such that an optical axis of the second lens unit and a center of the output end of the optical intensity-equalizing element are shifted in a same direction from an optical axis of the first lens unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a projection display device according to the present invention will be explained below in detail with reference to the accompanying drawings. The present invention is not limited to the embodiments.

<First Embodiment>

Figure 1:
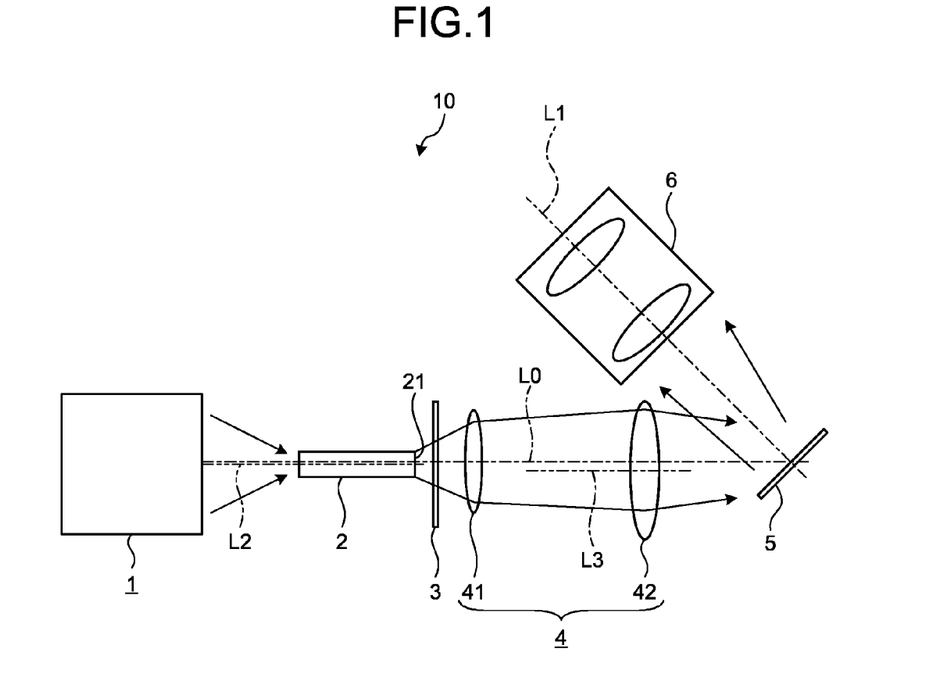
FIG. 1 depicts a configuration of a projection display device according to a first embodiment of the present invention.

FIG. 1 depicts a configuration of a projection display device 10 according to a first embodiment of the present invention. In FIG. 1, a schematic cross sectional configuration of the projection display device 10 is shown. The projection display device 10 enlarges and projects a light that is spatially modulated by a light valve. The projection display device 10 according to the first embodiment is configured to reduce a scattered light component, which is generated in an illumination optical system, and the like.

The projection display device 10 is configured to include an optical device (an illumination device) and a screen 7 that will be described later. The optical device includes a light source 1, an integrator element 2, an optical diffusion element 3, a relay optical system 4, a reflection light valve 5, and a projection optical system 6.

The light source 1 is a device that outputs a light for displaying an image. The light source 1 can be a plurality of monochrome light sources or a multicolor light source such as an LED and a laser. The light source 1 is arranged such that an optical axis of an output light matches an optical axis of a first lens unit 41, to output the light toward the integrator element 2. A case where the light source 1 outputs a laser light as an example of the light is explained below.

The integrator element (optical intensity-equalizing element) 2 is an element that integrates the laser light (light beam) from the light source 1. The laser light from the light source 1 is incident on the integrator element 2, and the integrator element 2 equalizes an optical intensity of the laser light by reflecting the laser light on its inner surface. An output end of the integrator element 2 serves as a plane light source 21 from which a laser light with an equalized optical intensity is output. The laser light output from the plane light source 21 is input to the optical diffusion element 3.

The optical diffusion element 3 is a plate-shaped element which is arranged such that an optically operating plane thereof is arranged to be substantially perpendicular to a center axis of the illumination optical system. The optical diffusion element 3 diffuses the laser light input from the plane light source 21 and outputs a diffused laser light to the relay optical system 4.

The relay optical system 4 includes the first lens unit (a first lens group) 41 and a second lens unit (a second lens group) 42. The first lens unit 41 includes one or plural lenses, and guides the laser light from the optical diffusion element 3 to the second lens unit 42 while condensing the laser light. The second lens unit 42 includes one or plural lenses, and guides the laser light from the first lens unit 41 to the reflection light valve 5 while condensing the laser light. In other words, the relay optical system 4 includes the first lens unit 41 that condenses the diffused light from the optical diffusion element 3, and the second lens unit 42 that further condenses the laser light from the first lens unit 41 and guides the laser light to the reflection light valve 5. The relay optical system 4 illuminates the reflection light valve 5 with the laser light by guiding the laser light from the plane light source 21 to the reflection light valve 5.

The reflection light valve 5 is an element that performs a spatial intensity modulation of an incident laser light and outputs a spatially intensity-modulated light, on which a plurality of pixels are arranged in a two-dimensional array. The reflection light valve 5 is, for example, a reflection optical modulating element such as a DMD. The reflection light valve 5 is formed by arranging a plurality of movable mirror elements (micro-mirrors) (for example, a few hundred thousand mirrors) each corresponding to each of the pixels in a plane, in which an inclination angle (tilt) of each of the mirror elements is configured to be changed in response to pixel information.

When employing an incident laser light for displaying an image, each of the mirror elements of the reflection light valve 5 is inclined by a predetermined angle (for example, 12 degrees) in a predetermined direction with respect to a reference plane on which the mirror elements are arranged. With this operation, an incident light flux of the laser light incident on the mirror element is reflected toward the projection optical system 6.

On the other hand, when not employing an incident laser light for displaying an image, each of the mirror elements of the reflection light valve 5 is inclined by another predetermined angle (for example, −12 degrees) in a predetermined direction with respect to the reference plane on which the mirror elements are arranged. With this operation, an incident light flux of the laser light incident on the mirror element is reflected toward an optical absorption plate (not shown).

The projection optical system 6 is configured to include a projection lens. The projection optical system 6 projects the laser light guided from the reflection light valve 5 as an image light via a projection lens to the screen 7 that will be described later. A light flux incident on an optical absorption plate is not used for an image projection on the screen 7.

In the projection display device 10 according to the first embodiment, the integrator element 2 and the second lens unit 42 are arranged being deviated from the optical axis (center axis) of the first lens unit 41 and the like by a predetermined distance.

In FIG. 1, the optical axis of the first lens unit 41 is an optical axis L0. Furthermore, an optical axis of the second lens unit 42 (an optical axis after adjusting an arrangement position) is an optical axis L3, and an optical axis of the integrator element 2 (an optical axis after adjusting an arrangement position) is an optical axis L2. Moreover, an optical axis of the projection optical system is an optical axis L1. The optical axis L0 is the optical axis of the conventional illumination optical system (the second lens unit and the integrator element).

The integrator element 2 is configured with a columnar member (a rod) made of a transparent and uniform material such as glass, a tubular member (a light pipe) formed in a hollow pipe with a reflection mirror facing inward, and the like.

The laser light input into the integrator element 2 is mixed by being reflected on the inner surface multiple times. When the member forming the integrator element 2 is long enough along the optical axis direction, the intensity distribution of the laser light becomes substantially uniform at the plane light source 21 that is the output end of the integrator element 2.

If the side surfaces of the integrator element 2 are formed parallel to each other, the laser light is propagated while maintaining an angular component of the incident laser light. In this case, when the laser light from the light source 1 has a specific angular distribution, it is not possible to make the laser light uniform. If the light valve is illuminated with an illumination light having a nonuniform angular distribution, it can cause an inconvenient situation where color unevenness or brightness unevenness appears on a picture due to an interaction of the laser light with the projection optical system or the screen at the subsequent stage.

For example, when a multicolor light source such as an LED or a laser is used, there is often a significant difference between light emission angle characteristics of primary colors. Therefore, even when monochromatic lights emitted from spatially different positions are aligned to a substantially common optical axis with an synthesizing optical system, the angular distribution of the integrated light remains nonuniform. Furthermore, when multiple monochromatic light sources are used for each of the monochromatic lights instead of a single monochromatic light source, because a characteristic angular distribution is generated by spatial arrangements of the monochromatic light sources, it also contributes to generation of color unevenness and the like.

Furthermore, when the light source is a laser, it is not possible to provide a high quality picture (an image display) unless a speckle, which is significantly generated in a coherent light case, is reduced. To improve the nonuniformity of the light from the light source and the speckle caused by the coherent light described above, it suffices to make a part of an optical surface that forms the illumination optical system a scattering surface or to add an optical element such as a diffusion plate.

In the projection display device 10 according to the first embodiment, the optical diffusion element 3 is arranged at a stage behind the integrator element 2 and at a prior stage (in front of) the first lens unit 41, by which the uniformity of the angular distribution of the light source 1 is achieved. A position of the optical diffusion element 3 in the illumination optical system is determined by taking into considering the influence of the diffusion element 3 on the entirety of the projection display device 10.

Figure 2:
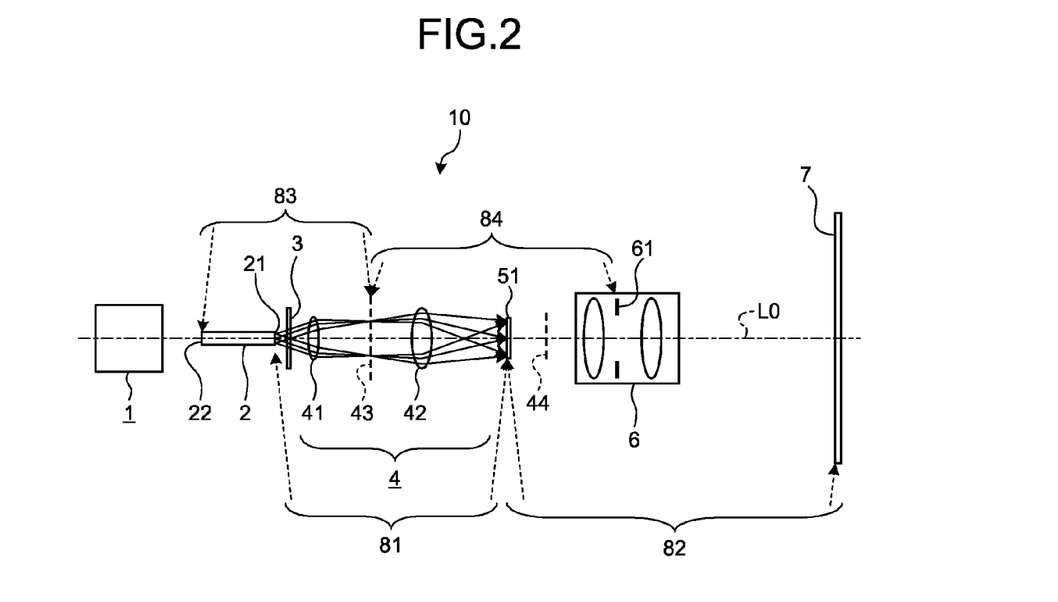
FIG. 2 is a schematic diagram explaining conjugate relations of optical systems in the projection display device according to the first embodiment.

FIG. 2 is a schematic diagram explaining conjugate relations of optical systems of the projection display device according to the first embodiment. To simplify the following explanations, there is explained a case where a transmission light valve 51 is employed instead of the reflection light valve 5.

In an optical conjugate relation 81 (hereinafter, "the conjugate relation 81") indicating a operation of the relay optical system 4, the plane light source 21 formed on the output end of the integrator element 2 is an objective plane and a display element plane of the transmission light valve 51 is an image plane. In other words, the plane light source 21 and the transmission light valve 51 are arranged on an optical path of the projection display device 10 so as to be the objective plane and the image plane, respectively, by which the plane light source 21 and the transmission light valve 51 have the conjugate relation 81.

Furthermore, in an optical conjugate relation 82 (hereinafter, "the conjugate relation 82"), the transmission light valve 51 is an objective plane and the screen 7 is an image plane. In other words, the transmission light valve 51 and the screen 7 are arranged on the optical path of the projection display device 10 so as to be the objective plane and the image plane, respectively, by which the transmission light valve 51 and the screen 7 have the conjugate relation 82.

Moreover, in an optical conjugate relation 83 (hereinafter, "the conjugate relation 83"), an input end 22 of the integrator element 2 is an objective plane and a virtual plane 43 between the first lens unit 41 and the second lens unit 42 is an image plane. In other words, the input end 22 and the virtual plane 43 are arranged on the optical path of the projection display device 10 so as to be the objective plane and the image plane, respectively, by which the input end 22 and the virtual plane 43 have the conjugate relation 83.

In addition, in an optical conjugate relation 84 (hereinafter, "the conjugate relation 84"), the virtual plane 43 is an objective plane and an optical aperture 61 included in the projection optical system 6 is an image plane. In other words, the virtual plane 43 and the optical aperture 61 are arranged on the optical path of the projection display device 10 to be the objective plane and the image plane, respectively, by which the virtual plane 43 and the optical aperture 61 have the conjugate relation 84. In FIG. 2, a virtual plane, which corresponds to an image plane when the first lens unit 41 is an objective plane, is indicated by a virtual plane 44.

Because the configuration is taken to concurrently establish the four conjugate relations 81 to 84, the relay optical system 4 can propagate the laser light from the light source 1 efficiently. The transmission light valve 51 is illuminated with the laser light propagated through the relay optical system 4, thereby the image light can be guided to the screen 7.

Considering a combination of the conjugate relation 81 and the conjugate relation 82, the plane light source 21 is optically conjugate with the screen 7. Therefore, the optical diffusion element 3 can not only reduce the nonuniformity of the angular distribution of the laser light from the light source 1, but also exert a direct effect on the screen 7. For example, in the case of the projection display device 10 that employs the laser light source, it is possible to reduce the speckle that generates on the screen 7.

Even if the optical diffusion element 3 is arranged at the virtual plane 43, it is possible to reduce the nonuniformity of the angular distribution of the laser light from the light source 1. Although the angular distribution of the light beam passed through the first lens unit 41 is changed from that at the plane light source 21, by optimizing the characteristic of the optical diffusion element 3 according to the angular distribution of the light beam at an arrangement position of the optical diffusion element 3, it is possible to obtain substantially the same diffusion effect regardless of the arrangement position. However, because the virtual plane 43 is optically conjugate with the optical aperture 61 of the projection optical system 6 as indicated by the conjugate relation 84, it is difficult to obtain a positive effect on the screen 7 with the optical diffusion element 3.

Figure 3:
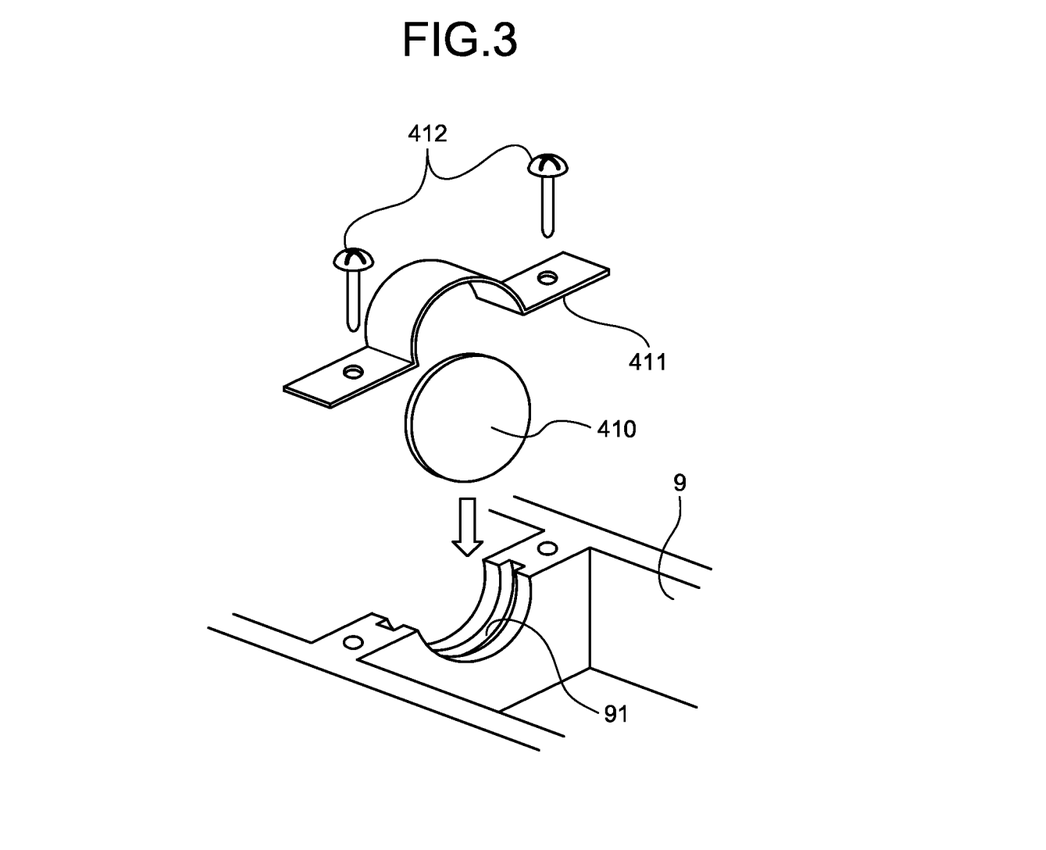
FIG. 3 depicts an example of a structure of a first lens unit.

Meanwhile, if the optical diffusion element 3 is arranged between the plane light source 21 and the first lens unit 41, another problem (decrease of contrast or the like) may arise. A specific method of mounting the first lens unit 41 is explained below. FIG. 3 depicts an example of a structure of the first lens unit 41. In FIG. 3, the overall structure of the first lens unit 41 is shown in a perspective view.

The first lens unit 41 includes a fixing part 411 that fixes a lens 410, screws 412, and a groove structure 91 formed on a housing 9 of the projection display device 10 for positioning an arrangement of the lens 410.

In the first lens unit 41, a lower portion of the lens 410 is inserted in the groove structure 91, an upper portion of the lens 410 is pressed by the fixing part 411 such that the position and the orientation of the lens 410 are not changed, and the fixing part 411 is fixed to the housing 9 by the screws 412. This structure, in which the groove structure 91 is formed as a part of the housing 9, is superior in terms of a point that an assembly becomes easy because a holder part for the lens 410 can be omitted, a point that it is possible to enhance a positional precision of the lens 410, and a point that it is possible to reduce the cost as a whole.

Furthermore, because a space in the housing 9 can be separated by using the groove structure 91, i.e., the front side space and rear side space is separated by the lens 410, a stray light component generated in the housing 9 can hardly propagate to a stage next to the lens 410. As a result, the contrast of the image display is improved.

However, if the optical diffusion element 3 is arranged at a prior stage of the lens 410, a back-scattering component by the optical diffusion element 3 or a light beam component exceeding an acceptance angle of the lens 410 becomes a stray light, which is stronger than the stray light that is generated when the optical diffusion element 3 does not exist. Then, the stray light becomes confined in the housing 9 (a prior stage side of the lens 410). This stray light leads the decrease of the contrast of the image display. When the contrast of the image display is decreased, it exerts a negative influence on a projection picture at the time of a black display.

The reason why the contrast is degraded when the optical diffusion element 3 is arranged at a prior stage of the lens 410 is explained below. An influence of a scattered light generated in a space at a prior stage of the lens on the light valve is explained, as a behavior of the strong scattered light generated by the optical diffusion element 3.

Figure 4:
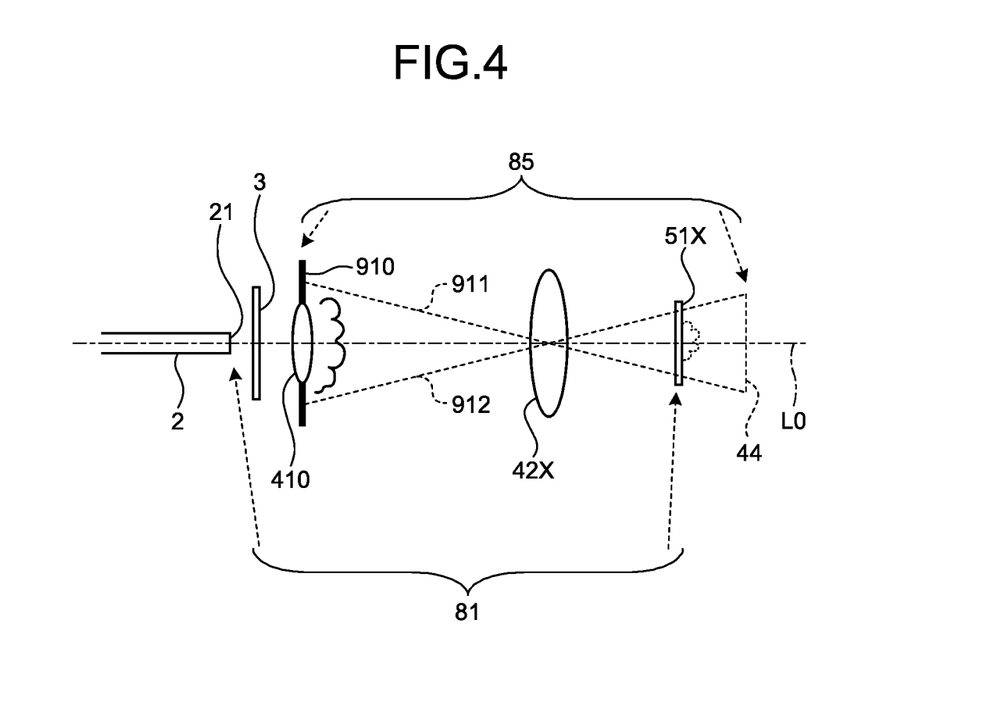
FIG. 4 is a schematic diagram explaining an arrangement position of a conventional second lens unit.

FIG. 4 is a schematic diagram explaining an arrangement position of a conventional second lens unit. In FIG. 4, a wall structure near the lens 410 is indicated by a wall structure 910. Furthermore, with respect to a second lens unit 42X, a virtual plane, which corresponds to an image plane when the lens 410 is an objective plane, is indicated by the virtual plane 44. In an optical conjugate relation 85 (hereinafter, "the conjugate relation 85"), the lens 410 is the objective plane and the virtual plane 44 is the image plane.

Conventionally, as shown in FIG. 4, the second lens unit 42X is arranged in the projection display device 10 such that an optical axis of the second lens unit 42X and an optical axis of the lens 410 are located at the same position. In this case, the plane light source 21 and a light valve 51X are optically conjugate due to the combination of the second lens unit 42X and the lens 410. Further, the second lens unit 42X itself has a function of forming an image of a plane near the lens 410 at a subsequent stage of the light valve 51.

Figure 5:
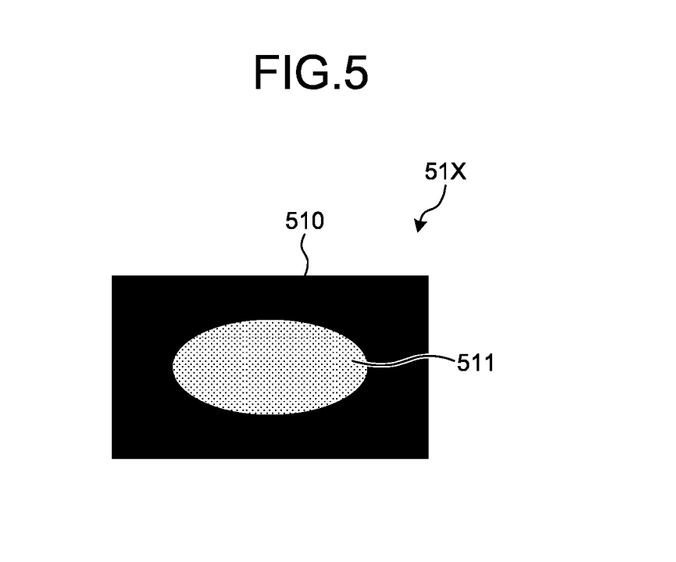
FIG. 5 depicts a bright area on a light valve when the second lens unit is arranged in the arrangement position shown in FIG. 4.

The second lens unit 42X is arranged closer to the light valve 51 than to the lens 410. Therefore, not only an aperture portion of the lens 410 but a range including a part of the wall structure 910 around the aperture portion, by which the laser light is blocked, is taken as an objective plane as indicated by light beams 911 and 912 shown in FIG. 4, and the laser light is imaged at a subsequent stage of the light valve 51X. At this time, as shown in FIG. 5, a phenomenon occurs in which only a predetermined range on the light valve 51X (a bright area 511 located at the center) becomes slightly brighter than other areas in an effective area 510.

Therefore, in the first embodiment, the second lens unit 42 is arranged in the projection display device 10 such that the optical axis of the second lens unit 42 is at a position slightly deviated from a position of the optical axis of the lens 410.

Figure 6:
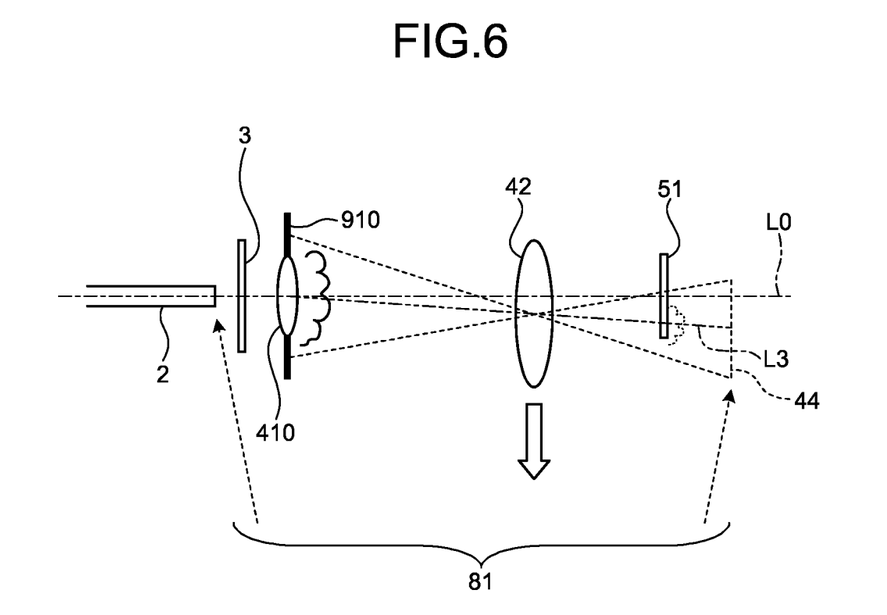
FIG. 6 is a schematic diagram explaining an arrangement position of the second lens unit in the projection display device according to the first embodiment.
Figure 7:
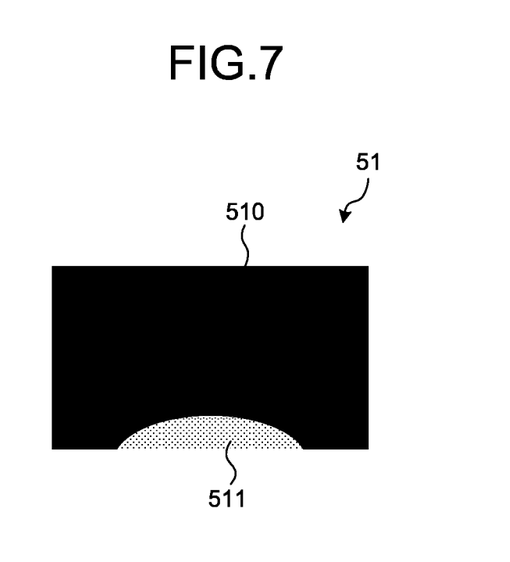
FIG. 7 depicts a bright area on a light valve when the second lens unit is arranged in the arrangement position shown in FIG. 6.

FIG. 6 is a schematic diagram explaining an arrangement position of the second lens unit 42 in the projection display device 10 according to the first embodiment. When the second lens unit 42 is shifted slightly downward in the vertical direction with respect to the optical axis of the lens 410, an illumination area on the light valve 51 in the conjugate relation 81 is shifted by an amount corresponding to a shift amount of the second lens unit 42. Although the illumination area is partially missing for the light valve 51, it is possible to move a part of the bright area 511 generated at the center of the light valve 51 outside the effective area 510 of the light valve 51, as shown in FIG. 7.

Furthermore, the integrator element 2 is arranged at a position corresponding to the arrangement position of the second lens unit 42. Specifically, the integrator element 2 is moved in a direction with which a deviation of the optical axis due to the shift of the illumination area is compensated by a distance for compensating the deviation. An illumination optical system matching the arrangement position of the second lens unit 42 is formed by the arrangement position of the integrator element 2. This makes it possible to resolve a phenomenon that the illumination of the light valve 51 is partially missing.

When the shift amount of the second lens unit 42 is smaller than a predetermine amount, there is no influence on the generation of the scattered light component due to the optical diffusion element 3. It is because the scattered light component reaching the light valve 51 is remained outside the light valve 51 by the shift (the arrangement position) of the second lens unit 42 at the prior stage.

With this slight adjustment of the arrangement in the illumination optical system, an optical image of an end optical plane of the first lens unit 41 (an optical plane of a second lens 410B that will be described later) is formed at a position deviated from an input opening of the projection lens. Therefore, it is possible to prevent the decrease of the contrast caused by the scatter light, which is generated due to a characteristic arrangement of the optical diffusion element 3. As a result, a relation between the optical axes of the constituent elements becomes, for example, the relation (the optical axes L1 to L3) shown in FIG. 1.

Figure 8:
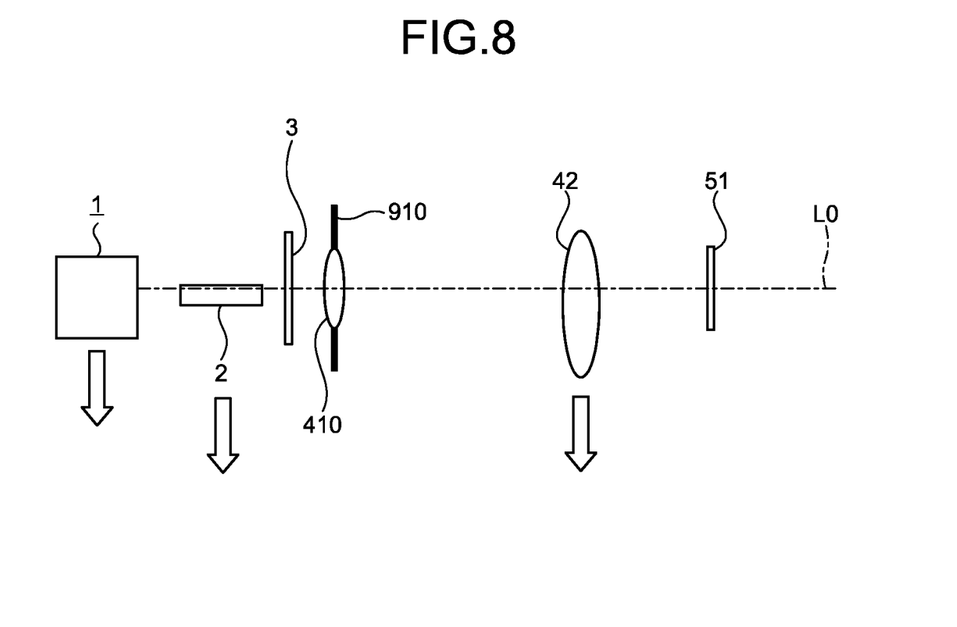
FIG. 8 depicts an example of a configuration of an illumination optical system.

FIG. 8 depicts an example of a configuration of the illumination optical system. In FIG. 8, an example of arrangement positions of the second lens unit 42 and the integrator element 2. As shown in FIG. 8, the second lens unit 42 according to the first embodiment is arranged such that a position deviated by a predetermined distance from the optical axis L0 of the lens 410 becomes the optical axis of the second lens unit 42. A deviation amount of the optical axis of the second lens unit 42 from the optical axis L0 is a distance with which a part of the bright area 511 can be moved outside the effective area 510 of the light valve 51 and the scattered light component reaching the light valve 51 can be caused to be outside the light valve 51.

In addition, the integrator element 2 is located at a position shifted from the optical axis L0 in a parallel manner such that a position deviated by a predetermined distance from the optical axis L0 of the lens 410 becomes the optical axis of the integrator element 2. In other words, the integrator element 2 is arranged such that the optical axis L2 of the integrator element 2 is parallel to the optical axis L0 of the first lens unit 41 and the optical axis L2 is deviated from the optical axis L0 by a predetermined distance. With this arrangement, in the projection display device 10, both the second lens unit 42 and the integrator element 2 are shifted in the same direction with respect to the optical axis L0 before the adjustment. A deviation amount of the integrator element 2 from the optical axis L0 is a distance with which the center axis of the laser light output from the integrator element 2 can be incident on the center of the second lens unit 42.

The light source 1 is arranged in the projection display device 10 such that the laser light from the light source 1 is incident on the center of the integrator element 2. Specifically, the light source 1 is arranged at a position that is shifted in the same direction and by the same distance as the integrator element 2. In other words, the light source 1 is arranged such that the optical axis of the emitted light matches the optical axis of the integrator element 2.

Figure 9:
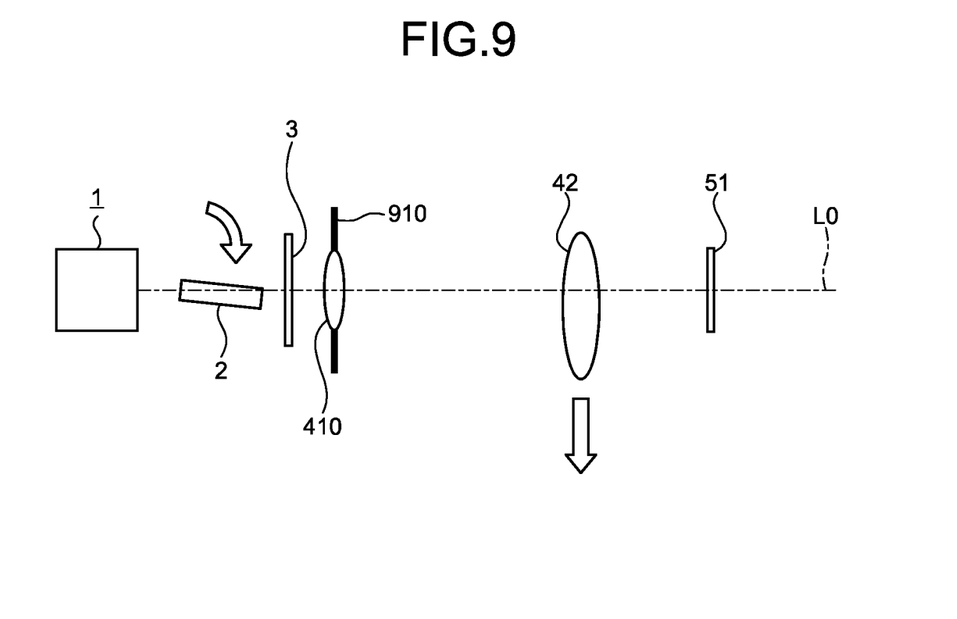
FIG. 9 depicts another example of a configuration of the illumination optical system.

The arrangement positions of the integrator element 2 and the light source 1 is not limited to the arrangement positions shown in FIG. 8. FIG. 9 depicts another example of a configuration of the illumination optical system. In FIG. 9, another example of the arrangement positions of the second lens unit 42 and the integrator element 2 is shown. As shown in FIG. 9, the second lens unit 42 is arranged such that a position deviated from the optical axis L0 of the lens 410 by a predetermined distance becomes the optical axis of the second lens unit 42.

In addition, the integrator element 2 is arranged such that the output end of the laser light is rotated around a center position of the input end of the laser light. Specifically, the integrator element 2 is arranged such that the optical axis L0 passes through the center of the input end of the integrator element 2 and the output end of the integrator element 2 is substantially at the same position as the output end of the integrator element 2 shown in FIG. 8. In other words, the integrator element 2 is arranged such that the center of the input end is on the optical axis of the light emitted from the light source 1, and the center of the output end is shifted from the optical axis of the first lens unit 41. With this arrangement, the optical axis of the integrator element 2 is tilted from the optical axis of the light emitted from the light source 1 by a predetermined angle. The light source 1 does not need to be shifted, and is arranged at a position at which the laser light can be emitted on the optical axis L0.

Figure 10:
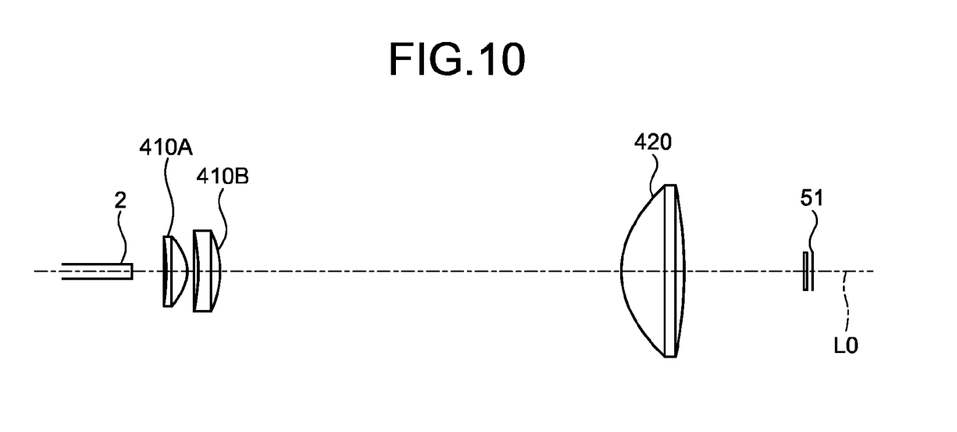
FIG. 10 depicts an example of configurations of the first lens unit and the second lens unit.

A specific design example of the first lens unit 41 and the second lens unit 42 is explained with reference to FIG. 10. FIG. 10 depicts an example of configurations of the first lens unit 41 and the second lens unit 42. An illumination optical system in which three lenses are arranged between the integrator element 2 and the light valve 51 is explained as an example of the illumination optical system.

In the lighting optical system, a first lens 410A and the second lens 410B are arranged as the lens 410 of the first lens unit 41. The second lens 410B is an end optical plane (an end lens unit) of the first lens unit 41. In other words, the second lens 410B is a lens that is arranged at a position most proximate to the light output side among the lenses included in the first lens unit 41. In addition, a third lens 420 is arranged as a lens of the second lens unit 42 in the illumination optical system. With this configuration, the divergent light beam from the integrator element 2 is guided to the third lens 420 through the first lens 410A and the second lens 410B.

For example, it is assumed that a focal length of the first lens 410A is 18.7 millimeters, a focal length of the second lens 410B is 39.6 millimeters, and a focal length of the third lens 420 is 40.8 millimeters. In addition, a distance from the integrator element 2 to the first lens 410A is 7 millimeters, a distance between the first lens 410A and the second lens 410B is 2.3 millimeters, and a distance between the second lens 410B and the third lens 420 is 64.3 millimeters. In this case, it is possible to build an illumination optical system having an F number of about 2.5, and efficiently illuminate the light valve 51 having a diagonal distance of 0.65 inch. In this design example, it is possible to cause the above described scattered light component to be outside the light valve 51 by simply shifting the third lens 420 with respect to the optical axis L0 by about 1 millimeter.

In the first embodiment, the second lens unit 42 and the integrator element 2 are arranged considering handling of optical components, such as a diffracted light caused by a micro-lattice structure of the light valve 51 an a scattered light generated in the illumination optical system, in order to display an image of a high contrast. With this arrangement, it is possible to display a high-contrast image by reducing the scatter light component generated in the optical system.

According to the first embodiment, the optical diffusion element 3 is arranged between the integrator element 2 and the end lens of the first lens unit 41. Furthermore, the second lens unit 42 and the integrator element 2 are arranged such that the optical axis of the second lens unit 42 and the output end of the integrator element 2 are shifted in the same direction from the optical axis of the first lens unit 41. Therefore, it is possible to keep a transmission efficiency of the light by maintaining an optically conjugate relation of the output end of the integrator element 2 and the light valve 51. Furthermore, because an optical image of the end optical plane of the first lens unit 41 is formed at a position deviated from the input opening of the projection lens, it is possible to avoid an input of a scattered light that is not required at the time of the black display to the projection lens. Therefore, it is possible to display a high-contrast image.

<Second Embodiment>

A second embodiment of the present invention is explained next with reference to FIG. 11. In the second embodiment, a curved mirror (a reflection mirror), a light valve 51, a projection optical system 6 are arranged in a Z-shaped folded configuration, and an arrangement position of the curved mirror is adjusted not to cause the scattered light component from an optical diffusion element 3 and the like to be incident on the light valve 51. A projection display device 10 according to the second embodiment has the same configuration as that of the projection display device 10 according to the first embodiment except for a neighborhood of the light valve 51 (a curved mirror 421B that will be described later), and therefore redundant explanations thereof will be omitted.

Figure 11:
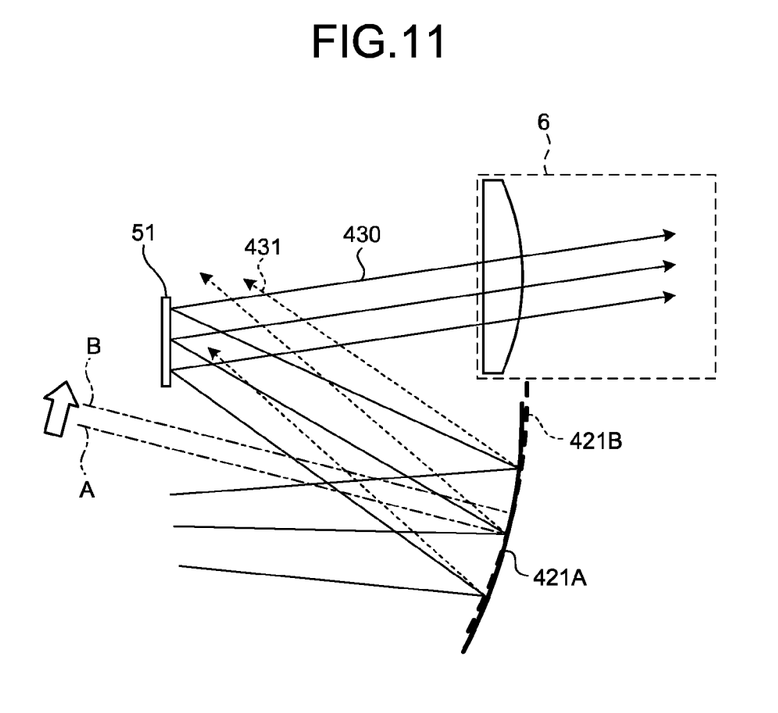
FIG. 11 depicts a configuration of an illumination optical system of a projection display device according to a second embodiment of the present invention.

FIG. 11 depicts a configuration of an illumination optical system of the projection display device 10 according to the second embodiment. The illumination optical system of the projection display device 10 according to the second embodiment includes the curved mirror 421B arranged just at the front of (at a prior stage of) the light valve 51.

In the projection display device 10 according to the second embodiment, a laser light from a light source 1 is guided to the curved mirror 421B, and the laser light is reflected at the curved mirror 421B and incident on the light valve 51. The laser light reflected at the light valve 51 is projected to a screen 7 as an image light from the projection optical system 6.

In FIG. 11, a normal line of a conventional curved mirror 421A (a normal direction from a center of a mirror surface) is indicated by a normal line A, and a normal line of the curved mirror 421B according to the second embodiment is indicated by a normal line B. In the second embodiment, an arrangement position of the curved mirror shifted from a position of the curved mirror 421A to a position of the curved mirror 421B in order not to guide a scattered light component from the optical diffusion element 3 toward the light valve 51. Specifically, the curved mirror 421B is moved from the position of the curved mirror 421A in parallel such that the normal line B is shifted in parallel to the normal line A. In other words, the curved mirror 421B is arranged to shift in the vertical direction with respect to an optical axis of the laser light incident on the curved mirror 421A.

With this arrangement, a laser light beam 430 guided from the illumination optical system is incident on the light valve 51, and the laser light beam 430 from the light valve 51 is incident on the projection optical system 6 as an image light.

On the other hand, a laser light beam 431 (the scattered light component from the optical diffusion element 3 and the like), which is not used as the image light among the laser light beams guided from the illumination optical system, is incident on an absorption plate and the like without being incident on the light valve 51.

According to the second embodiment, it is possible to obtain an optical system layout more flexible than that in a case of forming the illumination optical system only with lens elements, owing to the curved mirror 421B. In addition, because the curved mirror 421B, the light valve 51, and the projection optical system 6 are arranged in a Z-shaped folded configuration, it is possible to configure the projection display device 10 in a compact manner.

Furthermore, because the arrangement position of the curved mirror 421B is shifted from the position of the curved mirror 421A in parallel, it is possible to obtain the same scattered-light reducing effect as the projection display device 10 according to the first embodiment in which the illumination optical system is configured only with the lens elements. Therefore, it is possible to display a high-contrast image.

When the projection display device 10 described in each of the first and second embodiments is applied to a projector device, it can be applied to either a projector device of a rear projection type (a rear projection type display device) or of a front projection type (a front projection type display device).

Figure 12:
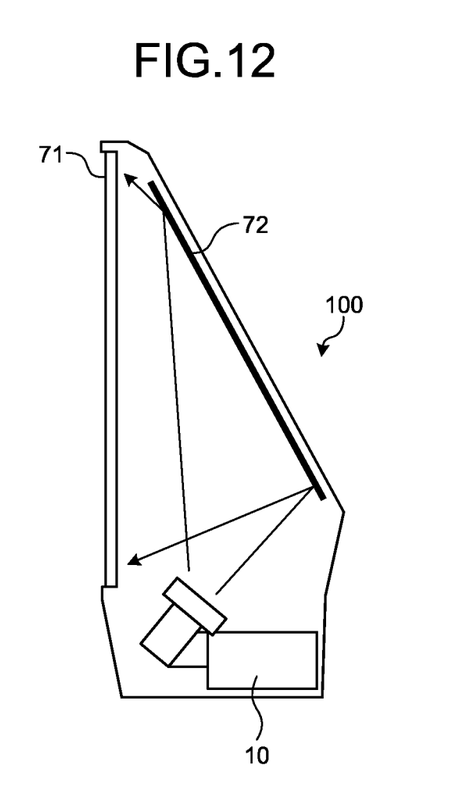
FIG. 12 depicts a configuration of a rear-projection projector device.

FIG. 12 depicts a configuration of a rear-projection projector device 100. The rear-projection projector device 100 includes the projection display device 10 described in the first and second embodiments, a reflection mirror 72, and a screen 71. The laser light output from the projection display device 10 is reflected on the reflection mirror 72 and guided to the screen 71. The projection display device 10 can improve the contrast of a display image in both cases of being applied to the rear-projection projector device and being applied to a front-projection projector device.

According to the present invention, it is possible to display an image of a high contrast.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display device comprising:
a light source;
an optical intensity-equalizing element that equalizes an optical intensity of the light emitted from the light source;
an optical modulating element that performs a spatial intensity modulation of an input light and outputs the spatially intensity-modulated light;
an optical diffusion element that is arranged between the optical intensity-equalizing element and the optical modulating element, the optical diffusion element diffusing the light from the optical intensity-equalizing element;
a relay optical system that guides the light from the optical diffusion element to the optical modulating element, the relay optical system being configured such that an output end of the optical intensity-equalizing element and a display element plane of the optical modulating element are optically conjugate; and
a projection optical system that projects the spatially intensity-modulated light from the optical modulating element to a screen, wherein
the relay optical system includes a first lens unit that condenses an output light from the optical intensity-equalizing element and a second lens unit that further condenses a light from the first lens unit,
the optical diffusion element is arranged between the optical intensity-equalizing element and a lens of the first lens unit, the lens being arranged at a position most proximate to a light incident side, and
the second lens unit and the optical intensity-equalizing element are arranged such that an optical axis of the second lens unit and a center of the output end of the optical intensity-equalizing element are shifted in a same direction from an optical axis of the first lens unit.

2. The projection display device according to claim 1, wherein
the optical intensity-equalizing element is arranged such that an optical axis of the optical intensity-equalizing element is parallel to the optical axis of the first lens unit, and
the light source is arranged such that an optical axis of the light emitted from the light source matches the optical axis of the optical intensity-equalizing element.

3. The projection display device according to claim 1, wherein
the light source is arranged such that an optical axis of the light emitted from the light source matches the optical axis of the first lens unit, and
the optical intensity-equalizing element is arranged such that a center of an input end of the optical intensity-equalizing element is on the optical axis of the light emitted from the light source and the center of the output end of the optical intensity-equalizing element is shifted from the optical axis of the first lens unit.

4. A projection display device comprising:
a light source;
an optical intensity-equalizing element that equalizes an optical intensity of the light emitted from the light source;
an optical modulating element that performs a spatial intensity modulation of an input light and outputs the spatially intensity-modulated light;
an optical diffusion element that is arranged between the optical intensity-equalizing element and the optical modulating element, the optical diffusion element diffusing the light from the optical intensity-equalizing element;
a relay optical system that guides the light from the optical diffusion element to the optical modulating element, the relay optical system being configured such that an output end of the optical intensity-equalizing element and a display element plane of the optical modulating element are optically conjugate; and
a projection optical system that projects the spatially intensity-modulated light from the optical modulating element to a screen, wherein
the relay optical system includes a first lens unit that condenses an output light from the optical intensity-equalizing element and a second lens unit that further condenses a light from the first lens unit,
the optical diffusion element is arranged between the optical intensity-equalizing element and a lens of the first lens unit, the lens being arranged at a position most proximate to a light incident side,
the second lens unit includes a curved mirror, and the curved mirror is arranged so as to shift in a vertical direction with respect to an optical axis of a light incident on the curved mirror.

* * * * *